United States Patent
Nishikawa

(10) Patent No.: US 7,375,850 B2
(45) Date of Patent: May 20, 2008

(54) IMAGE OUTPUT APPARATUS, METHOD OF CONTROLLING THE IMAGE OUTPUT APPARATUS, AND IMAGE OUTPUT SYSTEM

(75) Inventor: Naoyuki Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1021 days.

(21) Appl. No.: 10/323,924

(22) Filed: Dec. 20, 2002

(65) Prior Publication Data

US 2003/0117636 A1   Jun. 26, 2003

(30) Foreign Application Priority Data

Dec. 25, 2001   (JP)   ............................. 2001-392731

(51) Int. Cl.
*B41J 1/00* (2006.01)
*G06F 15/00* (2006.01)
*G06G 5/00* (2006.01)
*G06K 9/32* (2006.01)

(52) U.S. Cl. ..................... 358/1.9; 358/521; 358/525; 345/606; 345/619; 382/300

(58) Field of Classification Search ................ 358/1.9, 358/518, 515, 538, 521, 525; 382/162, 167, 382/175–176, 300; 345/606, 619
See application file for complete search history.

(56) References Cited

U.S. PATENT DOCUMENTS 5,519,817 A   5/1996   Shinoaki et al. ............ 345/619
5,872,895 A * 2/1999 Zandee et al. ............... 358/1.9
5,872,902 A   2/1999   Kuchkuda et al. .......... 345/615
6,226,011 B1* 5/2001 Sakuyama et al. .......... 345/600
6,556,198 B1   4/2003   Nishikawa .................. 345/420

FOREIGN PATENT DOCUMENTS

| JP | 05-233770 A | 9/1993 |
| JP | 07-134776 A | 5/1995 |
| JP | 10-155094 | 6/1998 |
| JP | 11-353494 A | 12/1999 |
| JP | 2000-253267 | 8/2000 |
| JP | 2001-292331 A | 10/2001 |

\* cited by examiner

*Primary Examiner*—Kimberly Williams
*Assistant Examiner*—Charlotte M. Baker
(74) *Attorney, Agent, or Firm*—Fitzpatrick, Cella, Harper & Scinto

(57) ABSTRACT

Using a drawing engine, a printer subjects image data to color matching processing into its own device color space. If the image data is a geometric object having a change in color, a gradation handler interpolates a changed value of color in the geometric object in the device color space based upon results of the color matching at a point of the geometric object.

6 Claims, 7 Drawing Sheets

IMAGE OUTPUT APPARATUS, METHOD OF CONTROLLING THE IMAGE OUTPUT APPARATUS, AND IMAGE OUTPUT SYSTEM

FIELD OF THE INVENTION

This invention relates to an image output apparatus that performs color matching, a method of controlling this apparatus, and an image output system that includes this apparatus.

BACKGROUND OF THE INVENTION

Color printers that execute color matching processing using an ICC profile or the like have come into widespread use in recent years. Color matching refers to a technique for implementing device-independent color reproduction by effecting a mutual conversion between device-independent color space and device-specific color space.

In an ordinary printer, color matching processing is executed in accordance with a drawing object and it is contrived to achieve optimum color reproduction at all times. Examples of drawing objects processed by a color printer are geometric objects such as single lines and polygons and image data consisting of pixels. Color information is specified in some form for each of these objects. When an object is drawn, a drawing engine within the printer first executes color matching processing based upon the specified color information and then performs drawing successively to a rasterizing window or expansion area of a band memory or the like.

For example, in a case where a red triangle is drawn, a red (255, 0, 0) color is converted temporarily to device-independent color-space values by referring to a source profile. Next, based upon these device-independent color-space values, values in the output device (device values) are calculated by referring to a profile on the destination side, and these values are reported to the drawing engine to execute drawing.

An example of a method used to effect the color conversion is to embed data in a LUT constituted by a sample grid and estimate approximate values using linear calculation or the like such as 8-point interpolation. The interpolation operation is carried out by applying procedures 1), 2) below to each point and applying procedure 3) to the last point.

1) $Li=Pi+dPi*rateX$ {for each point}
2) $Mi=Li+dLi*rateY$ {for each point}
3) $Pi=Mi+dMi*rateZ$ {for last point}

Consider a case where the drawing object is so-called gradation accompanying a change in color. For example, consider a line object that changes from red to black from its starting point V1 to its end point V2. In such case it is required that color conversion processing be executed in accordance with a position of Vi on a drawn line, as illustrated in FIG. 1. If a change of the position on Y axis (y1-y2) is gentle with respect to a change of the position on X axis (x2-x1), in this case, i.e., if the value of y1-y2 is extremely small, there are instances where the result of the color conversion will not attain the desired value owing to quantization error in the computer.

SUMMARY OF THE INVENTION

Accordingly, an object of the present invention is to provide a technique for subjecting an object having gradation to color conversion processing in the color space on the output side, thereby making it possible to achieve smoother, more attractive color reproduction in the apparatus on the output side.

Another object of the present invention is to provide a technique that makes it possible to achieve smoother, more attractive color reproduction in the apparatus on the output side in a similar manner with regard to image data as well.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The invention will be better understood and its numerous objects and advantages will become more apparent to those skilled in the art by reference to the following drawings, in conjunction with the accompanying specification, in which.

DESCRIPTION OF THE PREFERRED EMBODIMENTS

Preferred embodiments of the present invention will now be described in detail in accordance with the accompanying drawings.

[First Embodiment]

Figure 1:
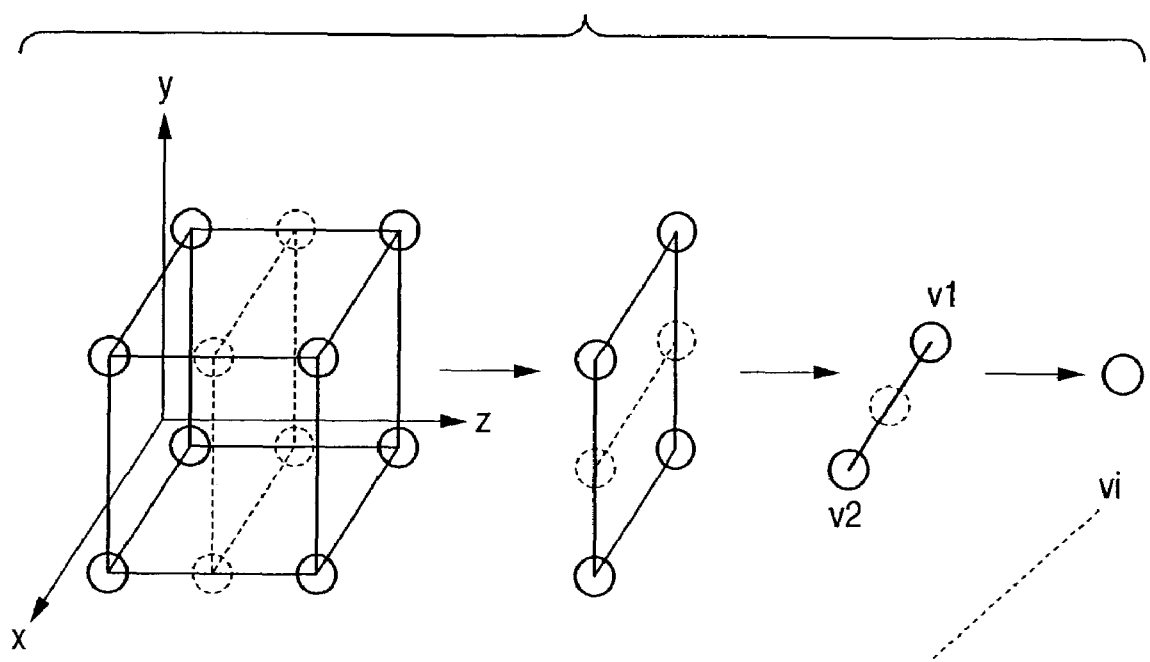
FIG. 1 is a diagram illustrating a concept in which an interpolated value changes in dependence upon position on a drawn line.
Figure 1:
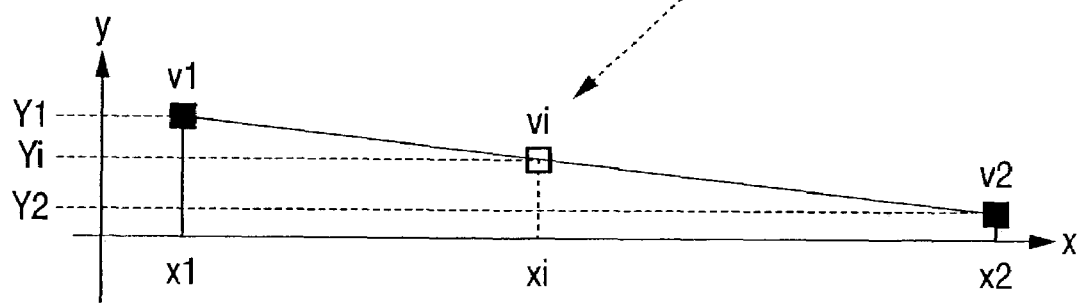
Figure 2:
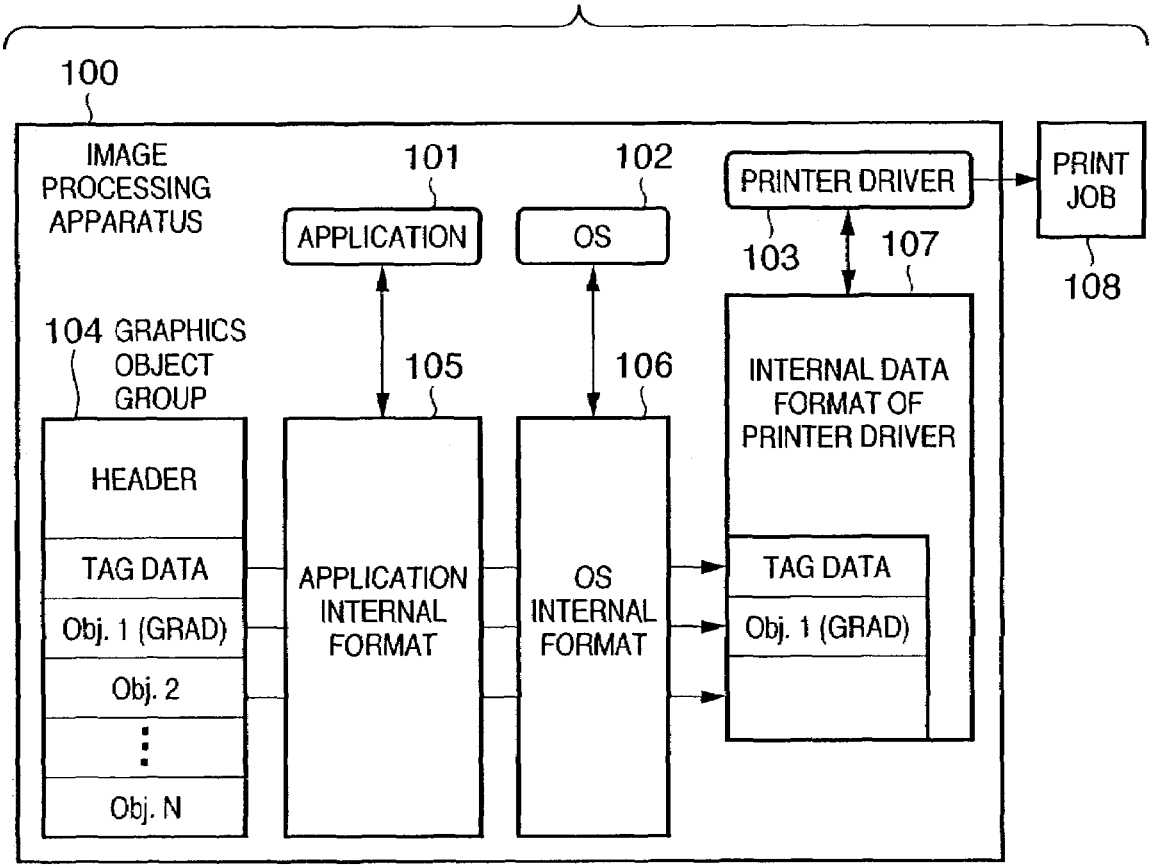
FIG. 2 is a block diagram illustrating a general system configuration according to an embodiment of the present invention.
Figure 2:
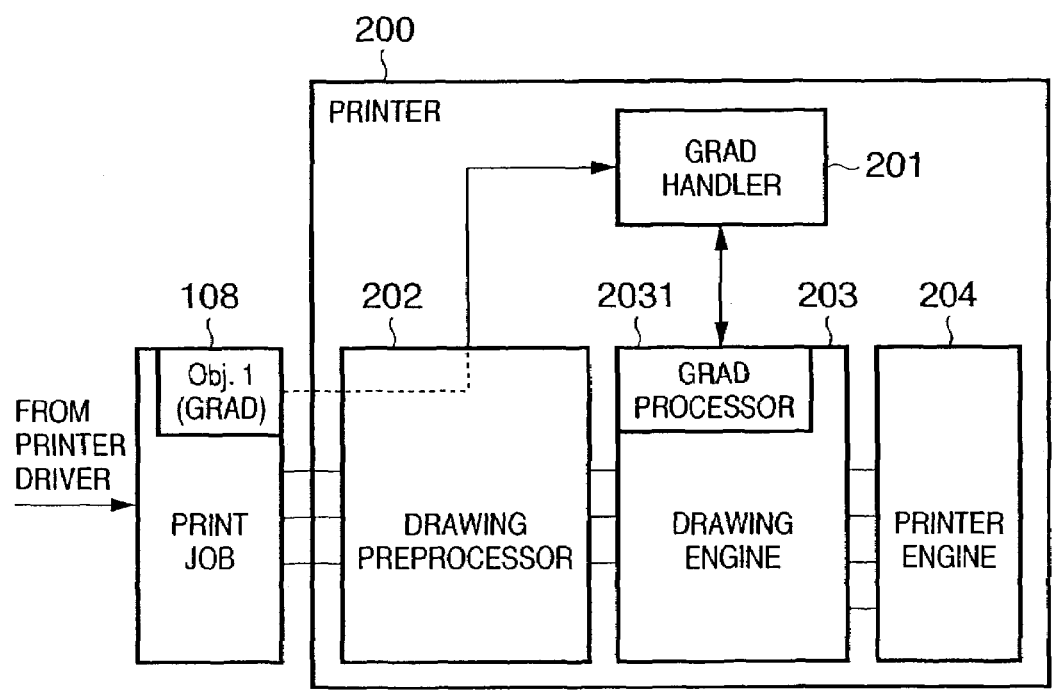

FIG. 2 is a block diagram illustrating a general system configuration according to an embodiment of the present invention and shows the manner in which an image processing apparatus 100 and a printer 200 are connected to each other. A drawing object group 104 such as graphics in the image processing apparatus 100 constitutes a group of data in a print job 108. The drawing object group 104 includes a gradation object (Obj. 1) having a color change or gradation (GRAD). This data has been stored upon being converted appropriately to an internal format 105 of an application 101 and an internal format 106 of an operating system (OS) 102.

When printing is carried out, the data to be printed is stored upon being converted to an internal format 107 within a printer driver 103. The data is transmitted to the printer 200 as the print job 108 when appropriate. At this time the data regarding the gradation object (Obj. 1) is sent to GRAD handler 201 through a drawing preprocessor 202 within the printer 200. The drawing preprocessor 202 distinguishes the gradation object from the other objects in the print job 108 and inputs the gradation object into the GRAD handler 201. The GRAD handler 201 applies only the gradation object to a drawing engine 203 so as to subject this object to draw processing different from that of the usual procedure.

In accordance with the entered print job 108, the drawing engine 203 subjects the object group to undergo drawing to color matching processing in its own device color space (e.g., CMYK color space). Thereafter, a GRAD processor 2031 in the drawing engine 203 subjects the entered gradation object to redraw processing, based upon color in the output-side color space at a point that has been set within this object, by suitably interpolating colors in other areas. That is, the gradation object is subjected to color conversion processing in color space (e.g. CMYK color space) on the printer side.

A specific example of color conversion processing according to this embodiment will be described with reference to FIG. 3.

Figure 3A:
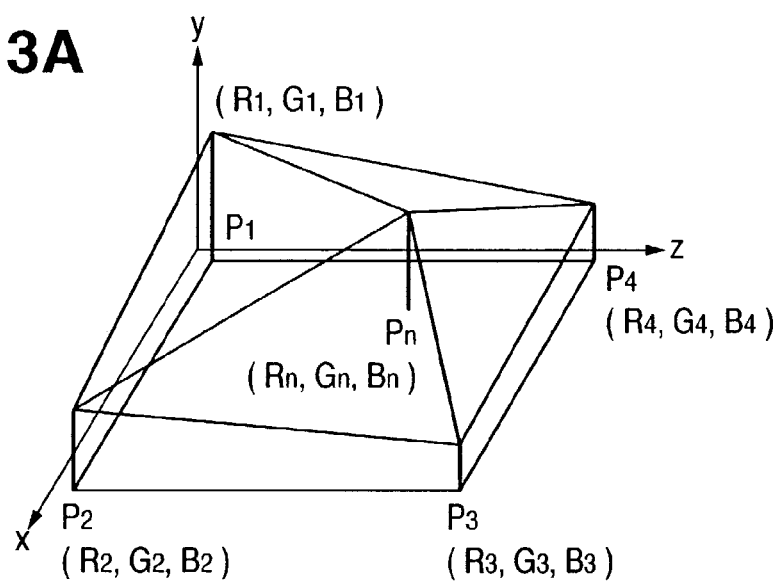
FIGS. 3A, 3B and 3C are diagrams illustrating an example of color conversion of a rectangular object exhibiting a change in color.
Figure 3B:
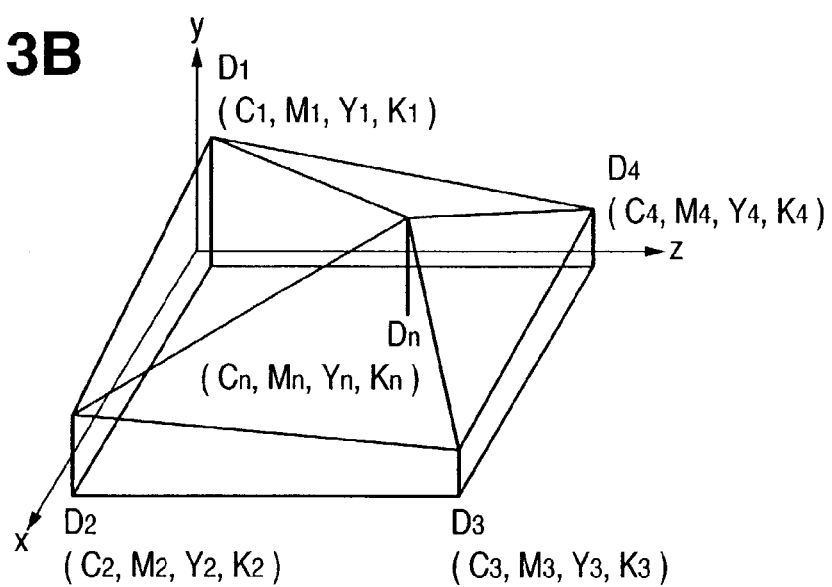

In FIG. 3, (a) illustrates an example of a rectangular gradation object and shows the manner in which color (Ri,Gi,Bi) has been set at each of four points Pi (i=1, 2, 3, 4). More specifically, (a) in FIG. 3 illustrates an example in which color has been set in color space (RGB color space in this case) on the input side. In accordance with conventional color conversion processing, draw processing on the printer side has heretofore been executed presuming a change in color in color space (e.g., RGB color space) on the input side.

In FIG. 3, (b) illustrates the result of subjecting the gradation object of FIG. 3(a) to a color conversion according to this embodiment. According to this embodiment, the color at each of the five points Pi indicated in color space (RGB color space in this case) on the input side is converted to color Di (i=1, 2, 3, 4) in color space (CMYK color space in this case) on the output side, and color Dn between points is calculated by interpolation based upon the color at each of these points. That is, interpolation of Dn is carried out in color space on the output side. The printer 200 therefore can achieve more attractive color reproduction more smoothly.

Figure 3C:
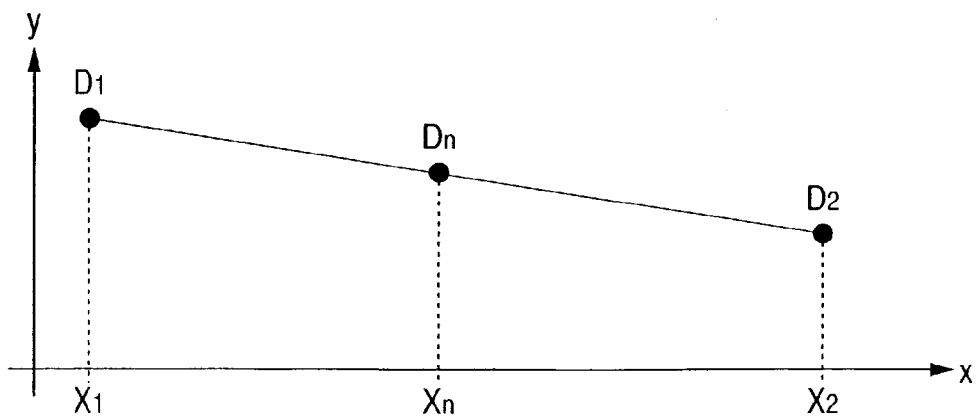

Operation according to this embodiment will be described with regard to an example shown in FIG. 3(c). First, corresponding device values (values in output color space) of D1 and D2, which are input values, are found. A value Dn on a drawn line is then calculated not by ordinary color matching processing but by interpolation based upon the device values of the above-mentioned two points. For example, if we assume that the device values with respect to D1 are C1, M1, Y1, K1, Dn are Cn, Mn, Yn, Kn and C2, M2, Y2, K2 with respect to D2, then X1 (the value of position on X axis of Dn) between x1 (the value of position on X axis of D1) and x2(the value of position on X axis of D2) is found as follows for each of the colors:

$Cn=C1+(C2-C1)*[(Xi-x1)/(x2-x1)]$ {for each color}

In accordance with this embodiment, as described above, suitable points are set for a geometric object such as a line or polygon, and control of changed values of colors is performed in color space on the output side, as a result of which it is possible to achieve more attractive color reproduction more smoothly in the apparatus on the output side. This differs from conventional color conversion processing in color space on the input side according to the prior art.

[Second Embodiment]

A second embodiment of the present invention will now be described.

In accordance with the first embodiment described above, in case of data composed of a draw instruction or the like, such as a graphics object, it is possible to execute the appropriate processing even if the object is a gradation object. However, an object cannot be dealt with in the same manner if the object is an image or the like that has already been expanded into pixels.

Accordingly, in the second embodiment, if a gradation object has been generated in a function or the like on the side of the application or operating system, information (a Graphics Description Operator, or "GDO" below) such as an operator or descriptor utilized at this time is embedded simultaneously in an extension tag portion of the image. The image is re-drawn on the printer side utilizing the embedded extension tag. The above characterizes the second embodiment. That is, processing in color space (e.g., CMYK color space) on the output side can be executed even with respect to an image file.

In a case where an image has been generated by setting linear gradation with respect to, e.g., a rectangular area, data of the GDO is expressed as a collection of the following character strings:

```
{%image
region x1, y1, x2, y2
colorspace rgb
operator {
         grad {fill p1, p2, p3, p4, opt1, linear)
         }
}
```

In the above strings, "region x1, y1, x2, y2" defines a rectangular object, x1 and x2 are coordinates on the X-axis, and y1, and y2 are coordinates on the Y-axis. Therefore, the rectangular object is defined by four coordinates (x1, y1), (x1, y2), (x2, y1) and (x2, y2).

Further, "colorspace rgb" defines the colorspace where the object exists. In this embodiment, the colorspace is RGB. "operator" defines the drawing operation that is to be executed. In the "operator", "grad" defines the type of the drawing operation in which the object have a gradation, "fill" is the operator command to fill the object, and "P1", "P2", "P3" and "P4" define the color values at the coordinates (x1, y1), (x1, y2), (x2, y1) and (x2, y2), respectively.

Also, "opt1" is the option command in the "operator" to draw the object and "linear" means the option in which the color of the object changes linearly.

Figure 4:
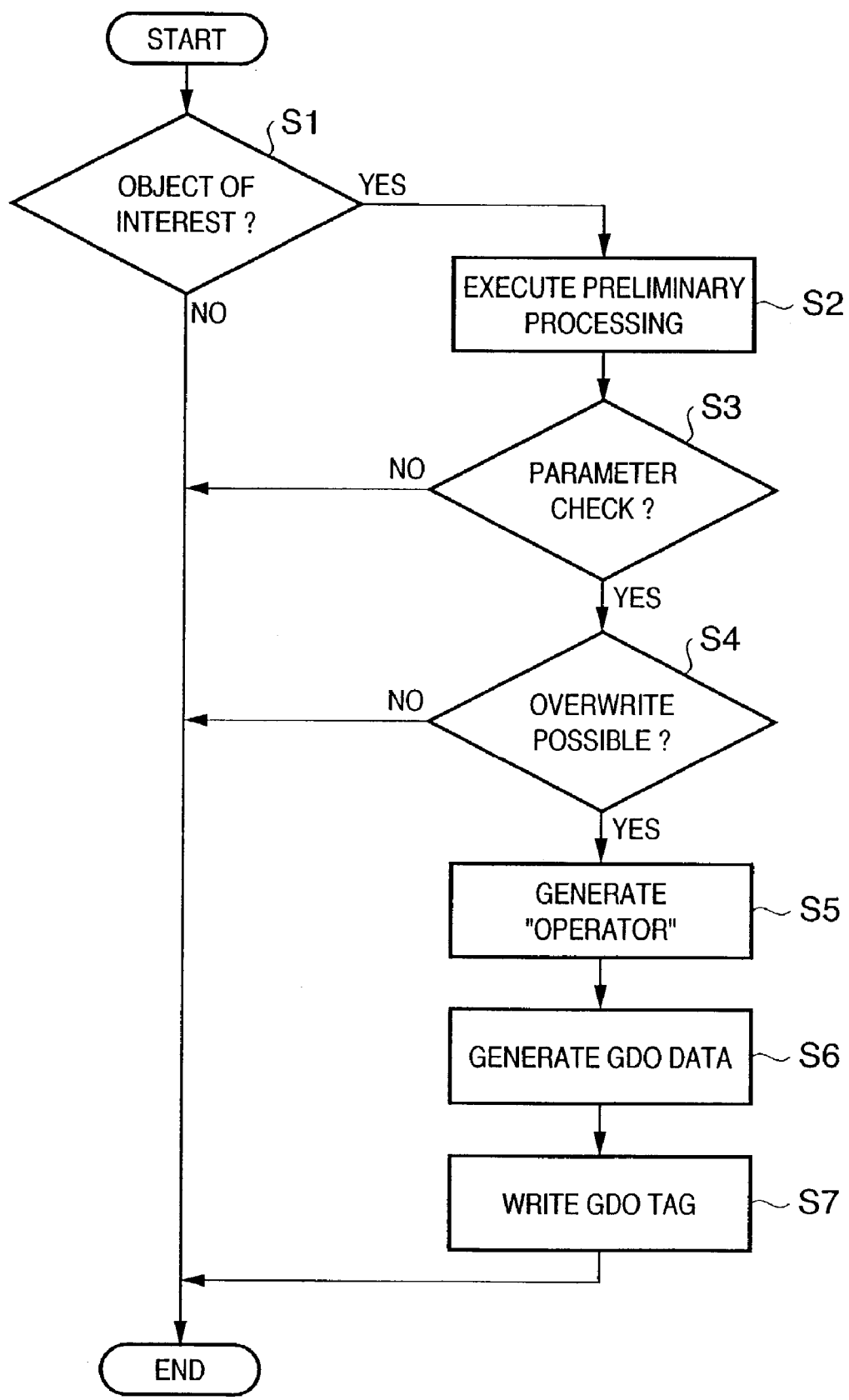
FIG. 4 is a flowchart illustrating processing for adding on an extension tag (GDO) according to a second embodiment.

FIG. 4 is a flowchart illustrating processing for embedding GDO data as the extension tag of an object. First, at step S1, it is determined whether data is an object of interest. In case of such an object, control proceeds to step S2, at which preliminary processing such as memory allocation is executed.

Next, at step S3, the object of interest and the environmental circumstances, etc., are checked as by parameters and control proceeds to step S4. Here whether overwriting of data is possible or not is investigated. If there is no problem, control proceeds to step S5 and an "operator" is generated.

GDO data is generated based upon the generated "operator" at step S6. Next, at step S7, add-on and write processing is executed with respect to the original data using the generated GDO data as the tag. Processing is then terminated.

Figure 5:
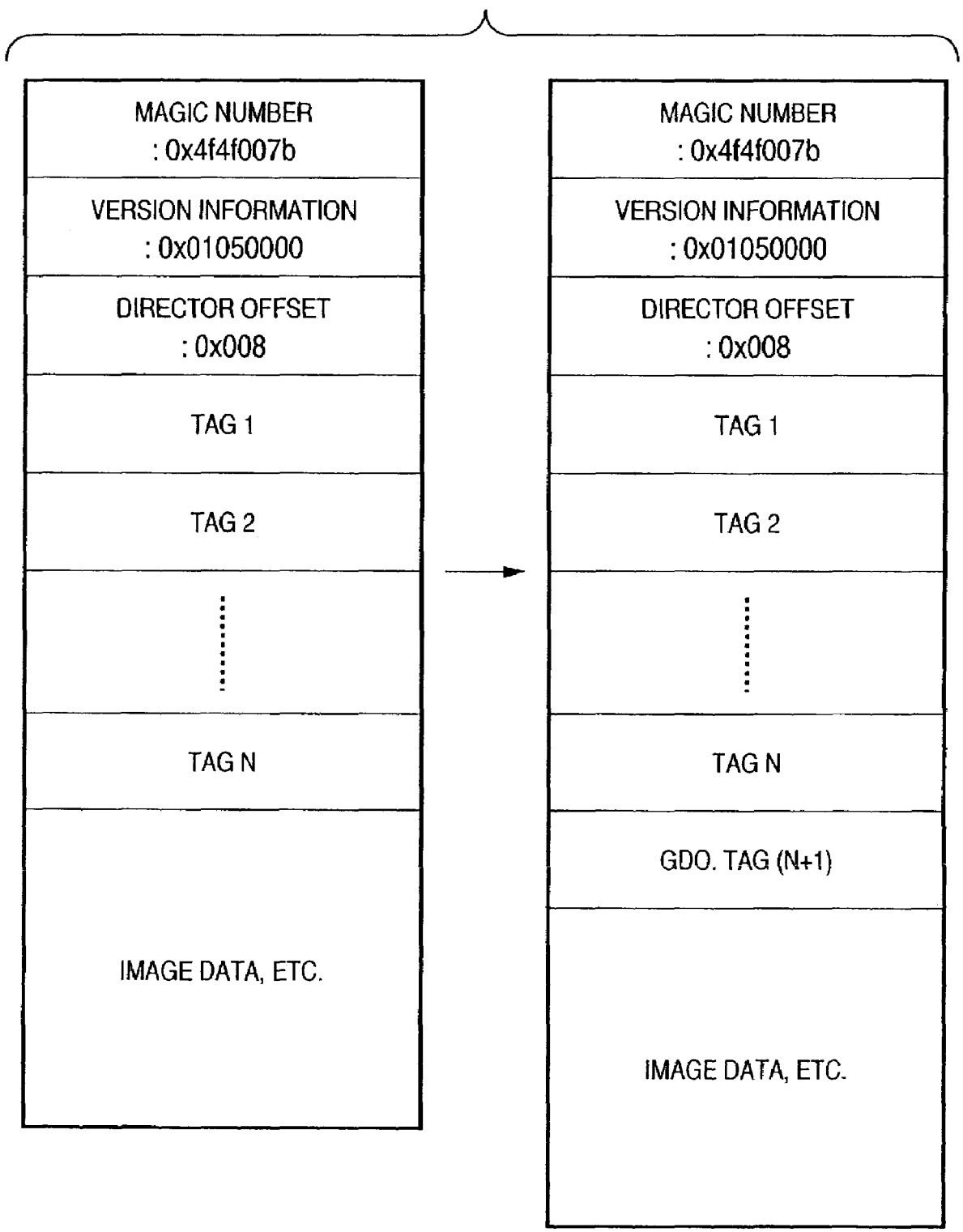
FIG. 5 is a diagram illustrating an image data format according to the second embodiment.

FIG. 5 is a diagram illustrating the format of image data onto which a GDO tag has been added according to the second embodiment. This illustrates the manner in which a new GDO tag [GDO.Tag(N+1)] is added by the series of processing steps described above.

Figure 6:
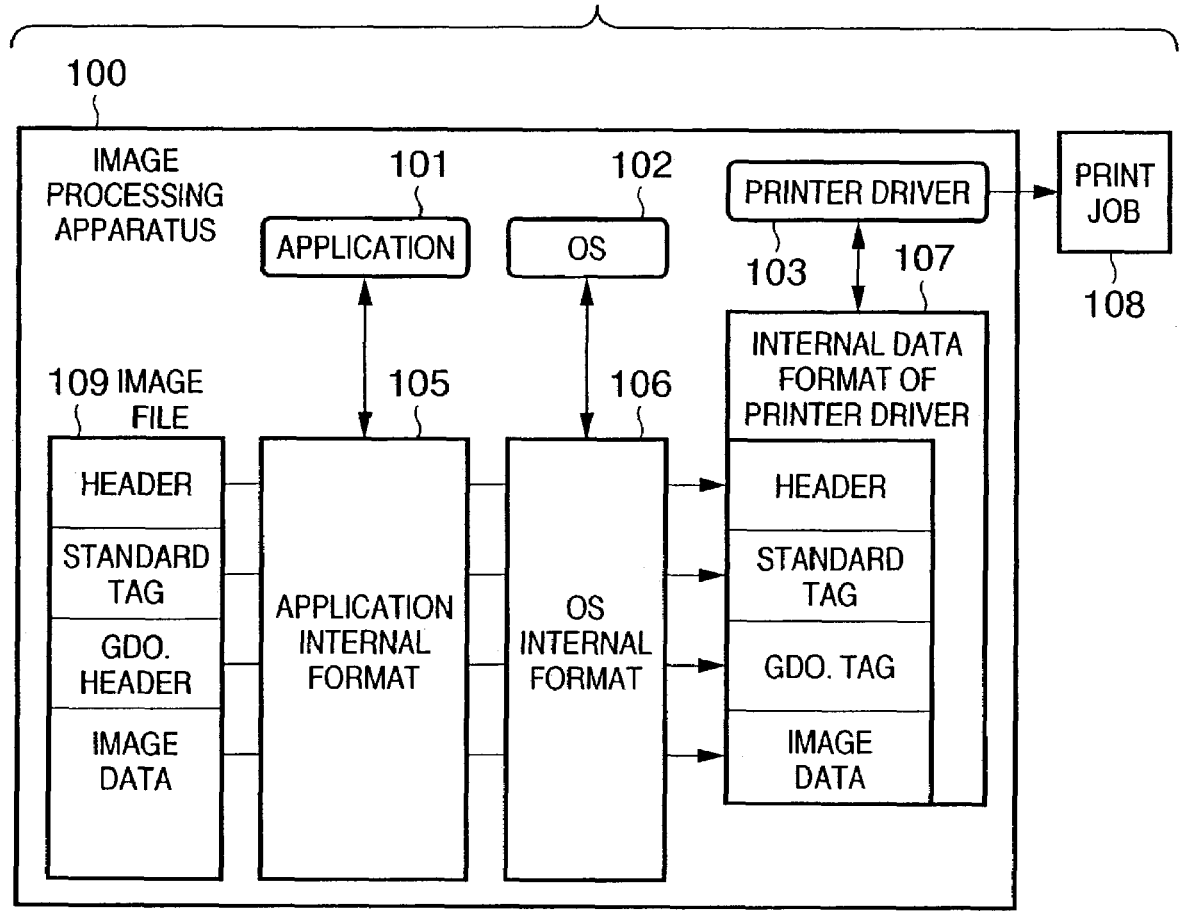
FIG. 6 is a block diagram illustrating a general system configuration according to the second embodiment.
Figure 6:
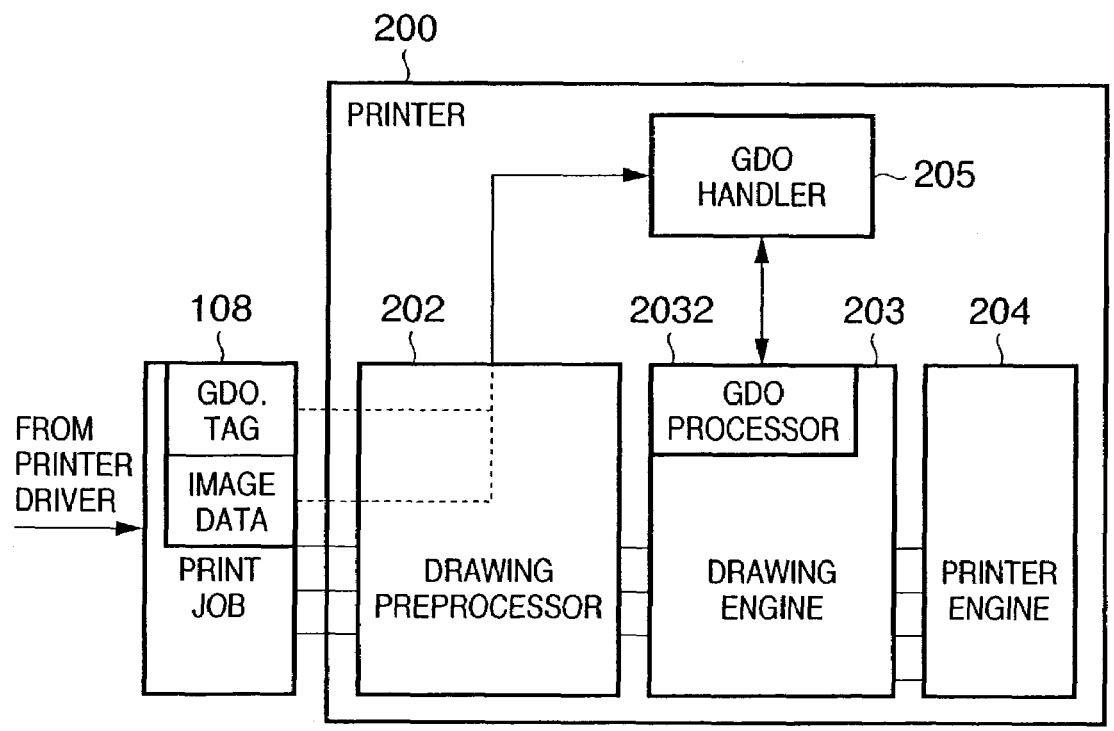

FIG. 6 is a block diagram illustrating a general system configuration according to the second embodiment and shows the manner in which the image processing apparatus 100 and the printer 200 are connected to each other. Components identical with those shown in FIG. 2 are designated by like reference characters and so a description thereof is omitted.

In the second embodiment, an image file 109 within the image processing apparatus 100 has the GDO tag provided internally by the above-described processing. Each item of data constituting the image file 109 has been converted appropriately to the internal format 105 of the application 101 and internal format 106 of the operating system 102, etc., and the converted data has been stored.

When printing is carried out, the data to be printed is stored upon being converted to the internal format 107 within the printer driver 103. The data is transmitted to the printer 200 when appropriate. At this time the GDO tag is sent to a GDO handler 205 within the printer 200. The GRAD handler 205 applies only the image data having the GDO tag to the drawing engine 203 so as to subject this data to draw processing different from that of the usual procedure. The drawing engine 203, which is provided internally with a GDO processor 2032, reads out the "operator", which has been set in the GDO tag, when image data having the GDO tag is input thereto, and executes redraw processing in accordance with what the "operator" specifies. At this time processing is executed appropriately in color space on the output side particularly in regard to a change in color such as gradation, and draw processing is executed based upon the result. More specifically, processing for color conversion is executed in color space (e.g., CMYK color space) on the printer side.

Figure 7:
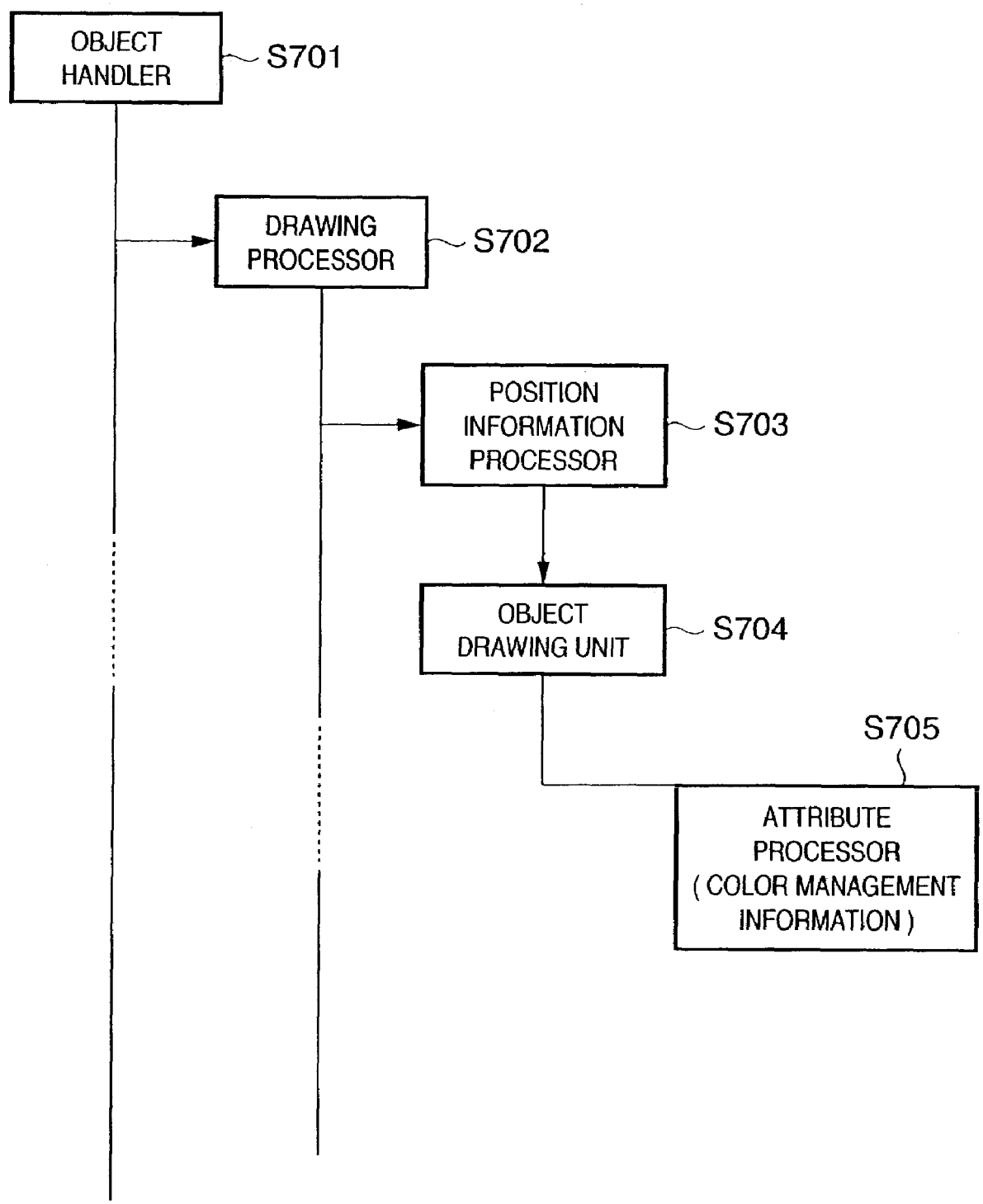
FIG. 7 is a block diagram illustrating the functional structure of a drawing engine according to the second embodiment.

FIG. 7 is a block diagram in which examples of functions in the drawing engine 203 are arranged from the higher order side of the process.

An object handler 701 executes a process in which objects within the print job 108 are processing in succession. A drawing processor (drawer) 702, etc., is called from this processor and processing is executed in continuous fashion.

In a case where an image file or the like includes a GDO tag and the tag is valid, the GDO handler 205 shown in FIG. 6 is started up and processing by the handler 205 is executed successively. Expansion processing, etc., is reconstructed in accordance with the operand within the GDO tag, and preparations for re-drawing proceed. At this time a position information processor 703 is generated, position-related information necessary at the time of expansion is calculated as appropriate, and this information is added onto the structure, etc., as part of the drawing information. An object drawing unit 704 executes processing so as to assemble all information groups necessary for drawing from the above-mentioned data group and attribute information (color management information, etc.) being controlled by an attribute processor 705.

By virtue of this series of processing steps, data shown in (a) of FIG. 3, for example, also is reconstructed in the output color space (e.g., CMYK color space), as illustrated in (b) of FIG. 3. As a result, attractive gradation reproduction can be achieved smoothly in the printer 200.

It may be so arranged that extension tag information is added on, in a manner similar to that of the second embodiment, also with regard to image data composed of a draw instruction or the like, such as a graphics object, as in the first embodiment, and it is also possible to execute redraw processing on the printer side by referring to the extension tag information.

In accordance with the second embodiment, as described above, information such as a GDO operator is embedded as an extension tag of an image file, and this is utilized in the expansion processing system on the side of the printer 200, thereby making it possible to execute image-data color conversion processing in color space on the output side. This differs from conventional color conversion processing in color space on the input side according to the prior art. As a result, it is possible to achieve more attractive color reproduction more smoothly in the printer 200.

The first and second embodiments described above may be provided with the functions thereof simultaneously.

Further, it goes without saying that the present invention is applicable even if the gradation pattern of interest is other than that illustrated.

Further, in FIG. 6 showing the second embodiment, an example in which image data is delivered to the GDO handler 205 in printer 200 is illustrated. However, if image data is unnecessary, as in a case where it is possible to perform redrawing completely by the operator within the GDO tag in the drawing engine 203, an arrangement in which the data is not transmitted may be adopted.

Further, an example in which GDO is transmitted as a tag is illustrated. However, effects similar to those of the second embodiment are obtained also if use is made of a transmission method other than this method.

[Other Embodiments]

The present invention can be applied to a system constituted by a plurality of devices (e.g., host computer, interface, reader, printer) or to an apparatus comprising a single device (e.g., copying machine, facsimile machine)

Further, the object of the present invention can also be achieved by providing a storage medium storing program codes for performing the aforesaid processes to a computer system or apparatus (e.g., a personal computer), reading the program codes by a CPU or MPU of the computer system or apparatus from the storage medium and then executing the program.

In this case, the program codes read from the storage medium realize the functions according to the described embodiments and the storage medium storing the program codes constitutes the invention.

The storage medium for providing the program codes may be a floppy disk, a hard disk, an optical disk, a magneto-optical disk, CD-ROM, CD-R, a magnetic tape, a non-volatile type memory card, or ROM.

Furthermore, besides the aforesaid functions according to the above-described embodiments realized by executing program codes read by a computer, the present invention also includes a case in which an OS (operating system) or the like working on the computer performs part or all of the processes in accordance with instructions of the program codes and realizes the functions of the above-described embodiments.

Furthermore, the present invention also includes a case in which, after the program codes read from the storage medium are written in a function expansion card which is inserted into the computer or in a memory provided in a function expansion unit which is connected to the computer, a CPU or the like contained in the function expansion card or unit performs part or all of the processes in accordance with instructions of the program codes and realizes functions of the above described embodiments.

In a case where the present invention is applied to the aforesaid storage medium, the storage medium stores program codes corresponding to the flowcharts described in the embodiments.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

In accordance with the present invention, as described above, it is possible to achieve smoother, more attractive color reproduction in an apparatus on the output side by subjecting an object having gradation to color conversion processing in color space on the output side.

Further, it is possible to achieve smoother, more attractive color reproduction in the apparatus on the output side in a similar manner with regard to image data as well.

As many apparently widely different embodiments of the present invention can be made without departing from the spirit and scope thereof, it is to be understood that the invention is not limited to the specific embodiments thereof except as defined in the claims.

What is claimed is:

1. An image output apparatus comprising:
   an input unit adapted to input a print job including drawing object data of an input image;
   a rendering unit adapted to render the drawing object data;
   a printing unit adapted to generate an output image according to the rendering result; and
   a gradation processing unit adapted to process the drawing object data of a gradation object, to generate a gradation image,
   wherein said gradation processing unit converts input color space data into first output color space data for each of a plurality of points set in the gradation object and interpolates second output color space data of each of other points in the gradation object based on the first output color space data.

2. An image output apparatus according to claim 1, wherein the drawing object data includes a tag and image data, and said gradation processing unit redraws the gradation image according to a gradation operator included in the tag.

3. An image processing method comprising the steps of:
   inputting a print job including drawing object data of an input image;
   rendering the drawing object data;
   generating an output image according to the rendering result; and
   processing the drawing object data of a gradation object to generate a gradation image,
   wherein said processing step includes a step of converting input color space data into first output color space data for each of a plurality of points set in the gradation object and interpolating second output color space data of each of other points in the gradation object based on the first output color space data.

4. An image processing method according to claim 3, wherein the drawing object data includes a tag and image data, and said processing step further includes redrawing the gradation image according to a gradation operator included in the tag.

5. A computer readable medium storing a program that causes a computer to implement an image processing method, said method comprising the steps of:
   inputting a print job including drawing object data of an input image; rendering the drawing object data;
   generating an output image according to the rendering result; and
   processing the drawing object data of a gradation object to generate a gradation image,
   wherein said processing step includes a step of converting input color space data into first output color space data for each of a plurality of points set in the gradation object and interpolating second output color space data of each of other points in the gradation object based on the first output color space data.

6. A computer program according to claim 5, wherein the drawing object data includes a tag and image data, and said processing step further includes redrawing the gradation image according to a gradation operator included in the tag.

* * * * *

UNITED STATES PATENT AND TRADEMARK OFFICE
CERTIFICATE OF CORRECTION

| | | |
|---|---|---|
| PATENT NO. | : 7,375,850 B2 | Page 1 of 1 |
| APPLICATION NO. | : 10/323924 | |
| DATED | : May 20, 2008 | |
| INVENTOR(S) | : Naoyuki Nishikawa | |

It is certified that error appears in the above-identified patent and that said Letters Patent is hereby corrected as shown below:

<u>COLUMN 8</u>:

Line 27, "rendering" should start new paragraph on Line 28.

Signed and Sealed this

Thirtieth Day of December, 2008

JON W. DUDAS
*Director of the United States Patent and Trademark Office*